US009536312B2

(12) United States Patent
Zhang et al.

(10) Patent No.: US 9,536,312 B2
(45) Date of Patent: Jan. 3, 2017

(54) DEPTH RECONSTRUCTION USING PLURAL DEPTH CAPTURE UNITS

(75) Inventors: Cha Zhang, Sammamish, WA (US); Wenwu Zhu, Basking Ridge, NJ (US); Zhengyou Zhang, Bellevue, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 13/107,986

(22) Filed: May 16, 2011

(65) Prior Publication Data

US 2012/0294510 A1 Nov. 22, 2012

(51) Int. Cl.
G06T 7/00 (2006.01)
G06K 9/20 (2006.01)

(52) U.S. Cl.
CPC .......... *G06T 7/0057* (2013.01); *G06K 9/2036* (2013.01); *G06T 7/0065* (2013.01); *G06T 7/0075* (2013.01); *G06T 2207/10048* (2013.01); *G06T 2207/10152* (2013.01); *G06T 2207/30196* (2013.01)

(58) Field of Classification Search
CPC ... H04N 13/0022; G06T 7/0057; G06T 17/00; G06T 7/0065; G06T 2207/10028; G06T 7/0075; G06T 2207/10012; G06F 3/017
USPC .......................................... 382/154; 345/419
See application file for complete search history.

(56) References Cited

U.S. PATENT DOCUMENTS

| | | | |
|---|---|---|---|
| 5,852,672 A * | 12/1998 | Lu ................................ | 382/154 |
| 6,320,978 B1 | 11/2001 | Szeliski et al. | |
| 6,639,596 B1 | 10/2003 | Shum et al. | |
| 6,856,314 B2 | 2/2005 | Ng | |
| 6,903,735 B2 | 6/2005 | Jeong et al. | |
| 7,075,625 B2 * | 7/2006 | Abe ............................ | 356/3.01 |

(Continued)

OTHER PUBLICATIONS

Hiep et al., Towards high-resolution large-scale multi-view stereo, Jun. 20-25, 2009 [retrieved Mar. 30, 2016], 2009 IEEE Conference on Computer Vision and Pattern Recognition, pp. 1430-1437. Retrieved from the Internet: http://ieeexplore.ieee.org/xpls/abs_all.jsp?arnumber=5206617.*

(Continued)

*Primary Examiner* — Matthew Bella
*Assistant Examiner* — Dennis Rosario
(74) *Attorney, Agent, or Firm* — Steve Wight; Sandy Swain; Micky Minhas

(57) ABSTRACT

A depth construction module is described that receives depth images provided by two or more depth capture units. Each depth capture unit generates its depth image using a structured light technique, that is, by projecting a pattern onto an object and receiving a captured image in response thereto. The depth construction module then identifies at least one deficient portion in at least one depth image that has been received, which may be attributed to overlapping projected patterns that impinge the object. The depth construction module then uses a multi-view reconstruction technique, such as a plane sweeping technique, to supply depth information for the deficient portion. In another mode, a multi-view reconstruction technique can be used to produce an entire depth scene based on captured images received from the depth capture units, that is, without first identifying deficient portions in the depth images.

20 Claims, 10 Drawing Sheets

(56) References Cited

U.S. PATENT DOCUMENTS

| | | | | |
|---|---|---|---|---|
| 7,492,927 | B2* | 2/2009 | Marschner | G06K 9/4661 345/420 |
| 8,224,064 | B1* | 7/2012 | Hassebrook | G01B 11/2513 345/585 |
| 8,230,367 | B2* | 7/2012 | Bell et al. | 715/863 |
| 8,457,356 | B2* | 6/2013 | Zheng | 382/103 |
| 8,730,309 | B2* | 5/2014 | Wilson | H04N 13/0275 348/51 |
| 8,823,775 | B2* | 9/2014 | Xu | 348/46 |
| 2008/0049100 | A1 | 2/2008 | Lipton et al. | |
| 2010/0277571 | A1* | 11/2010 | Xu et al. | 348/47 |
| 2010/0309292 | A1 | 12/2010 | Ho et al. | |
| 2011/0025827 | A1* | 2/2011 | Shpunt | G06T 7/0057 348/47 |
| 2011/0148858 | A1* | 6/2011 | Ni et al. | 345/419 |

OTHER PUBLICATIONS

Woetzel, et al., "Real-Time Multi-Stereo Depth Estimation on GPU with Approximative Discontinuity Handling," retrieved at <<http://ieeexplore.ieee.org/stamp/stamp.jsp?tp=&arnumber=1374688>>, First European Conference on Visual Media Production, 2004, pp. 245-254.

Mulligan, et al., "Stereo-Based Environment Scanning for Immersive Telepresence," retrieved at <<http://ieeexplore.ieee.org/stamp/stamp.jsp?tp=&arnumber=1273541>>, Proceedings of IEEE Transactions on Circuits and Systems for Video Technology, vol. 14, No. 3, Mar. 2004, pp. 304-320.

Kim, et al., "Generation of ROI Enhanced Depth Maps Using Stereoscopic Cameras and a Depth Camera," retrieved at <<http://ieeexplore.ieee.org/stamp/stamp.jsp?tp=&arnumber=4675816>>, Proceedings of IEEE Transactions on Broadcasting, vol. 54, No. 4, Dec. 2008, pp. 732-740.

Kim, et al., "Depth Map Creation and Mesh-based Hierarchical 3-D Scene Representation in Hybrid Camera System," retrieved at <<http://imaging.utk.edu/people/sykim/paper/PhD_Thesis_sykim.pdf>>, PhD thesis, Gwangju Institute of Science and Technology, 2008, 137 pages.

Lee, et al., "Multi-View Image Generation from Depth Maps and Texture Images using Adaptive Smoothing Filter," retrieved at <<http://imaging.utk.edu/people/sykim/paper/2008_ICESIT_sblee.pdf>>, International Conference on Embedded Systems and Intelligent Technology, Feb. 2008, 7 pages.

Kolmogorov, et al., "Multi-Camera Scene Reconstruction via Graph Cuts," retrieved at <<http://citeseerx.ist.psu.edu/viewdoc/download?doi=10.1.1.7.9360&rep=rep1&type=pdf>>, Proceedings of the 7th European Conference on Computer Vision—Part III, 2002, pp. 1-16.

Sun, et al., "Stereo Matching using Belief Propagation," retrieved at <<http://ieeexplore.ieee.org/stamp/stamp.jsp?tp=&arnumber=1206509>>, IEEE Transactions on Pattern Analysis and Machine Intelligence, vol. 25, No. 7, Jul. 2003, pp. 787-800.

Collins, Robert T., "A Space-Sweep Approach to True Multi-Image Matching," retrieved at <<http://citeseerx.ist.psu.edu/viewdoc/download?doi=10.1.1.71.2249&rep=rep1&type=pdf>>, Proceedings of the 1996 Conference on Computer Vision and Pattern Recognition, 1996, 8 pages.

Seitz, et al., "Photorealistic Scene Reconstruction by Voxel Coloring," retrieved at << http://citeseerx.ist.psu.edu/viewdoc/download?doi=10.1.1.39.3331&rep=rep1&type=pdf>>, Proceedings of the 1997 Conference on Computer Vision and Pattern Recognition, 1997, 7 pages.

Zhang, Zhengyou, "A Flexible New Technique for Camera Calibration," retrieved at <<http://research.microsoft.com/en-us/um/people/zhang/papers/TR98-71.pdf>>, Technical Report MSR-TR-98-71, Microsoft Corporation, Redmond, WA, 2000, 22 pages.

Zisserman, et al., "5—Stereo Reconstruction," retrieved at <<cs.nyu.edu/~fergus/teaching/vision/5_Stereo.ppt>>, slide presentation, retrieved on May 13, 2011, 30 pages.

* cited by examiner

DEPTH RECONSTRUCTION USING PLURAL DEPTH CAPTURE UNITS

BACKGROUND

A depth capture unit can use a structured light technique to produce a representation of the distances between an object and a reference point. The depth capture unit includes a projector and a camera. The projector projects a pattern onto the surface of the object, e.g., using infrared-spectrum light. At the same time, the camera captures an image of the object. The depth capture unit can then use a reconstruction technique to produce a depth image based on the projected pattern and the captured image.

A single depth capture unit may be unable to produce an entire depth representation of all portions of an object. For example, assume that the object corresponds to a person. The depth capture unit may be able to only capture one side of that person. To overcome this deficiency, a user may set up two or more depth capture units to capture different respective parts of an object. A synthesis module can then combine the depth images created by the individual depth capture units into a single depth scene.

However, the projected pattern from a first depth capture unit may overlap with the projected pattern from a second depth capture unit. These overlapping patterns may make it difficult for each depth processing unit to correctly interpret its captured image. More specifically, when performing reconstruction, a depth capture unit operates by examining its captured image for the presence of a single projected pattern; when it receives a combination of patterns that departs from this single-pattern expectation, it may fail to successfully interpret the captured image. This, in turn, may result in "holes" in the final depth scene, in which meaningful depth information is omitted. That is, the holes represent instances in which a depth capture unit has been unsuccessful in generating depth information due to the presence of overlapping projected patterns and/or other anomalies.

SUMMARY

A depth construction module is described for generating a depth scene that represents a depth map of an object. In one mode of operation, the depth construction module begins by receiving depth images provided by plural depth capture units. Each depth capture unit generates its depth image using a structured light technique, that is, by projecting a pattern onto the object and receiving a captured image in response thereto. The depth construction module then identifies at least one deficient portion in at least one depth image that has been received. The depth construction module then uses a multi-view reconstruction technique to supply depth information for the deficient portion. More specifically, the multi-view reconstruction technique operates by jointly taking into account plural captured images provided by the plural depth capture units.

In one example, a deficient portion may correspond to a portion in which there is an omission of reliable depth information due to, for instance, the presence of overlapping projected patterns which impinge the object. The depth construction module can determine the presence of deficient portions based on "holes" in the depth images, based on confidence scores generated by the depth capture units, and/or based on separately-generated confidence scores, etc.

According to another illustrative aspect, the multi-view reconstruction technique leverages a constraint relationship that affects the captured images provided by the depth capture units. Consider the simplified case of a first depth capture unit that produces a first projected pattern and receives a first captured image, together with a second depth capture unit that produces a second projected pattern and receives a second captured image. A first assertion specifies that a first portion ($I_{C1}$) of the first captured image will match a second portion ($I_{C2}$) of the second captured image when the first portion ($I_{C1}$) and the second portion ($I_{C2}$) represent a same part of the object's surface. A second assertion specifies that each of the first portion ($I_{C1}$) and the second portion ($I_{C2}$) will match an aggregation of projected patterns (e.g., $I_{P1}+I_{P2}$) which impinges that part of the object, presuming again that $I_{C1}$ and $I_{C2}$ represent that part of the object's surface.

According to another illustrative aspect, the multi-view reconstruction technique comprises a plane sweeping technique. The plane sweeping technique operates by performing hypothesis testing for different hypothetical surface positions on plural planes, to thereby estimate the actual surface of the object. In doing so, the plane sweeping technique can apply either the first above-described assertion or a combination of the first above-described assertion and the second above-described assertion.

According to another illustrative aspect, the plane sweeping technique, or some other appropriately configured multi-view reconstruction technique, can be alternatively used to produce a depth scene entirely from the captured images provided by the depth capture units. That is, in this second mode of operation, the depth construction module can forego the detection and processing of deficient portions in the depth images.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative depth capture system for producing a depth map of an object, leveraging the output of two or more depth capture units. Section B describes illustrative methods which explain the operation of the depth capture system of Section A. Section C describes illustrative processing functionality that can be used to implement any aspect of the features described in Sections A and B.

Figure 14:
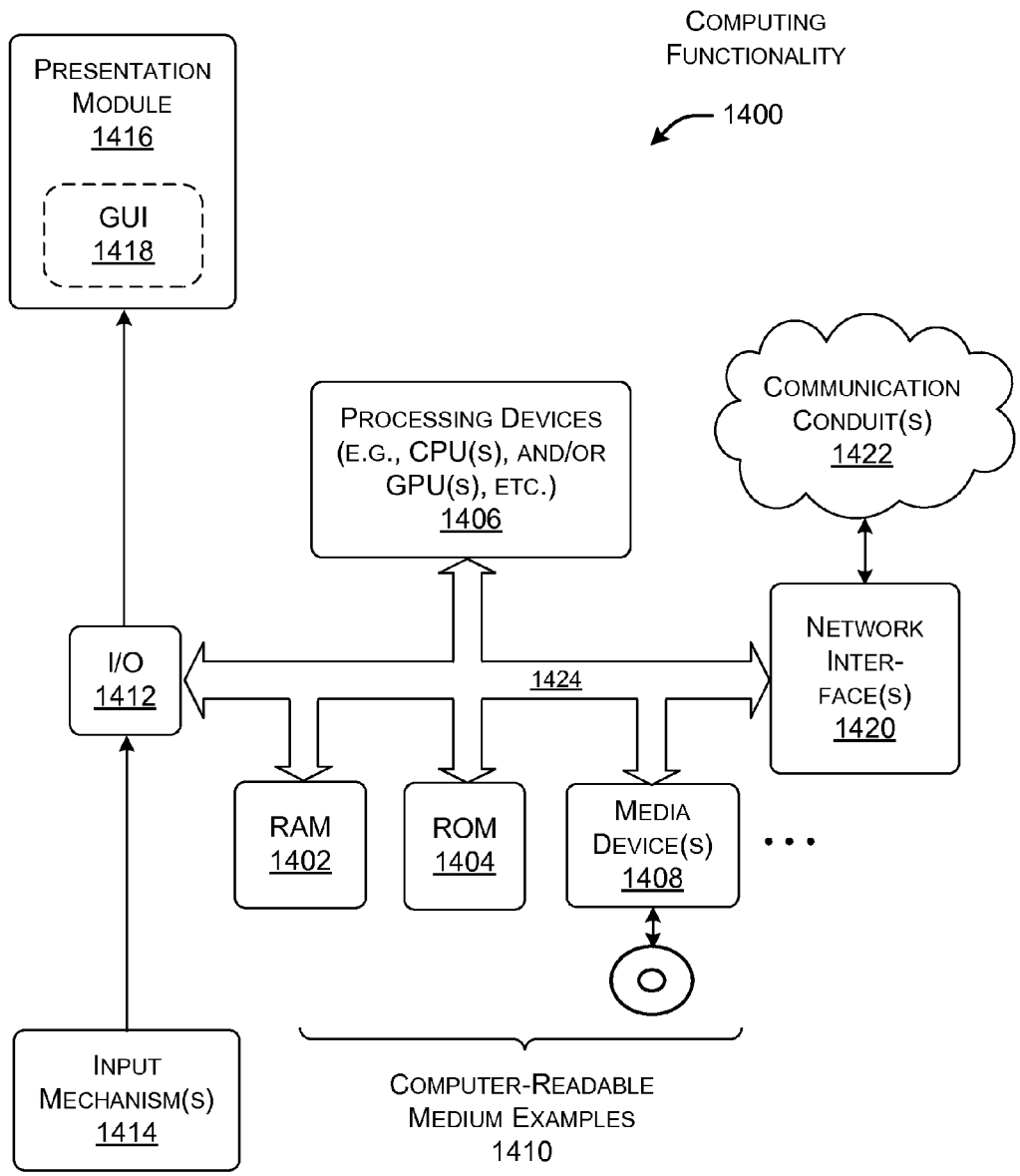
FIG. 14 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Depth Capture System

Figure 1:
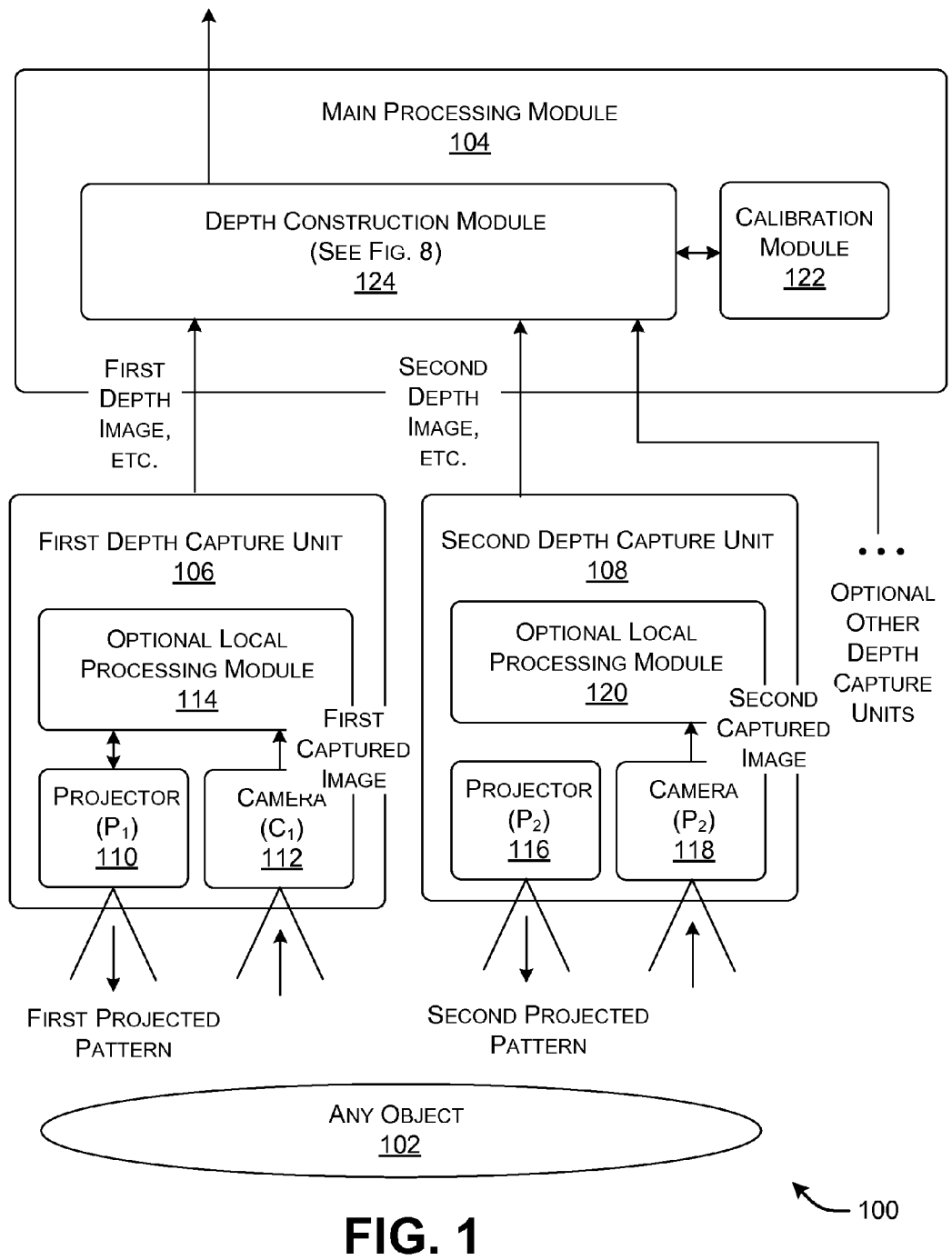
FIG. 1 shows an illustrative depth capture system for forming a depth map of an object using two or more depth capture units.

FIG. 1 shows a depth capture system 100 for capturing a depth scene that includes any object 102. The object 102 can comprise any inanimate object, any animate object (e.g., a person), or combination thereof. Further, the term object 102 may describe a combination of two or more component objects. In one merely representative case, the object 102 may correspond to a user who is playing a game or performing some other task.

The depth scene provides a depth map of the object 102 that represents the distances between different parts on the object 102 and a reference point. Different environments can use this depth map for different purposes. In a game environment, a game processor (not shown) can use the depth map to assess the movement and/or pose of a game player. The game processor can use this information, in turn, to control the operation of a game.

From a high-level perspective, the depth capture system 100 includes a main processing module 104 which interacts with two or more depth capture units. FIG. 1 specifically shows a representative first depth capture unit 106 and a second depth capture unit 108, although the depth capture system 100 can include any number of depth capture units. In operation, each depth capture unit captures a depth image of the object 102 from a particular vantage point. The main processing module 104 synthesizes the plural depth maps provided by the depth capture units (106, 108, . . . ) into a final depth scene. As a result of this synthesis, the final depth scene provides a more complete depth map of the object 102 compared to any depth image provided by an individual depth capture unit.

Each depth capture unit uses a structured light technique to produce its depth image. Consider the representative case of the first depth capture unit 106. This depth capture unit 106 includes a projector 110 for projecting a pattern of electromagnetic radiation onto the surface of the object 102. In one implementation, for instance, the projector 110 uses a laser to project a pattern of elements (e.g., dots) onto the surface of the object 102. For example, the pattern provides a random arrangement of elements, a regular arrangement of elements, or combination thereof; in any case, the first depth capture unit 106 registers the arrangement of the elements in the pattern, such that the pattern represents reference information that is a priori known to the first depth capture unit 106.

In one example, the projector 110 projects the pattern using infrared radiation that cannot be seen with the human eye, but can nonetheless be detected. A camera 112 (e.g., an infrared camera) captures an image of the object 102 that has been illuminated by the projector 110. In the following, the pattern that is produced by the projector 110 is referred to as a first projected pattern and the image captured by the camera 112 is referred to as a first captured image.

An optional local processing module 114 produces a first depth image based on the first projected pattern and the first captured image. In one implementation, the local processing module 114 performs this task by using cross-correlation to identify likely correspondences between portions of the first projected pattern and portions of the first captured image. The local processing module 114 then uses triangulation to determine the first depth image based on the correspondences between the first projected pattern and the first captured image. The local processing module may also optionally provide per-depth confidence scores. Each confidence score represents a degree of confidence at which a corresponding depth value has been assessed. For instance, where the depth value reflects an underlying correspondence between a particular portion of the first projected pattern and a particular portion of the first captured image, the confidence score can reflect the strength of that match.

By way of terminology, the word "portions" will be used broadly and generally herein to refer to any parts of an image or pattern. A portion can correspond to a pixel, a group (e.g., a patch) of pixels, an edge, and so on. Further, a portion can be represented using one or more attributes, such as pixel intensity, any image feature(s), etc.

The second depth capture unit 108 operates in the same manner as the first depth capture unit 106. Namely, the second depth capture unit 108 includes a projector 116 for shining a second projected pattern onto the surface of the object 102. A camera 118 receives a second captured image of the surface of the object 102. A local processing module 120 generates a second depth map based on the second projected pattern and the second captured image. Hence, the second depth capture unit 108 operates in a generally independent manner from the first depth capture unit 106. But, as will be described below, the second captured image produced by the camera 118 can include, at least in part, the first projected pattern produced by the first depth capture unit 106. Likewise, the first captured image produced by the camera 112 can include, at least in part, the second projected pattern produced by the second depth capture unit 108.

Figure 7:
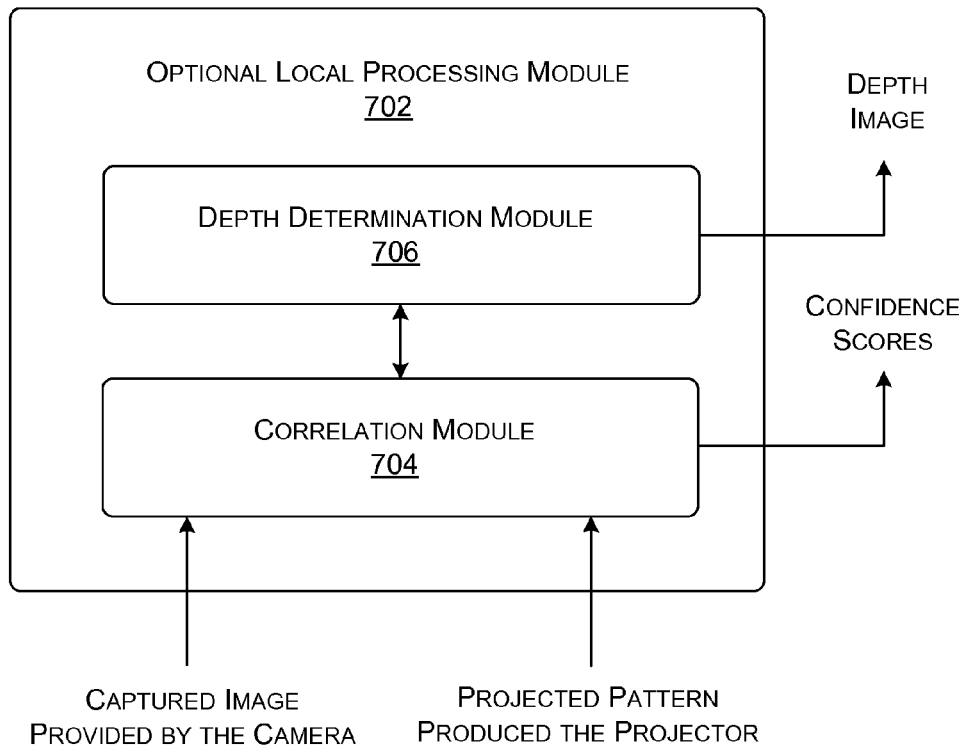
FIG. 7 shows one illustrative implementation of a local processing module used by a depth capture unit in FIG. 1.

FIG. 7, to be described in turn below, provides additional representative details regarding the operation of any local processing module. In terms of physical implementation, each depth capture unit can be implemented by any computing functionality, e.g., comprising one or more processing modules, one or more memory modules, etc. In one case, at least some of the functions performed by each depth capture unit can be implemented using an application-specific integrated circuit. In one implementation, each depth capture unit can be implemented, at least in part, by the Kinect™ controller, produced by Microsoft Corporation of Redmond, Washington. In another implementation, the illustrated components of a depth capture unit need not be integrated together in a single apparatus; any combination of any projector, any camera, and any processing functionality can be considered a depth capture unit. Further, a first depth capture unit can share any functionality with a second depth capture unit.

Although not shown, each depth capture unit can include other features. For example, each depth capture unit can include a video camera for capturing a conventional video image (e.g., an RGB image) of the object. In one implementation, the depth capture unit generates a mesh (or other 3D representation) of the object 102 based on the depth image. The depth capture unit can then apply the video image as a texture to the mesh, e.g., to thereby create a lifelike visual appearance to the mesh.

The main processing module 104 can be implemented by computing functionality that is physically separate from the depth capture units (106, 108, . . . ), such as by a separate personal computer or the like. Alternatively, at least some or all of the functions of the main processing module 104 can be integrated with the equipment that provides one or more depth capture units.

The main processing module 104 can include a calibration module 122 and a depth construction module 124. The calibration module 122 provides functionality for calibrating the cameras (112, 118, . . . ) used by the depth capture units (106, 108, . . . ). As a result of calibration, the depth capture system 100 registers the rotation and translation of each camera with respect to every other camera.

Figure 8:
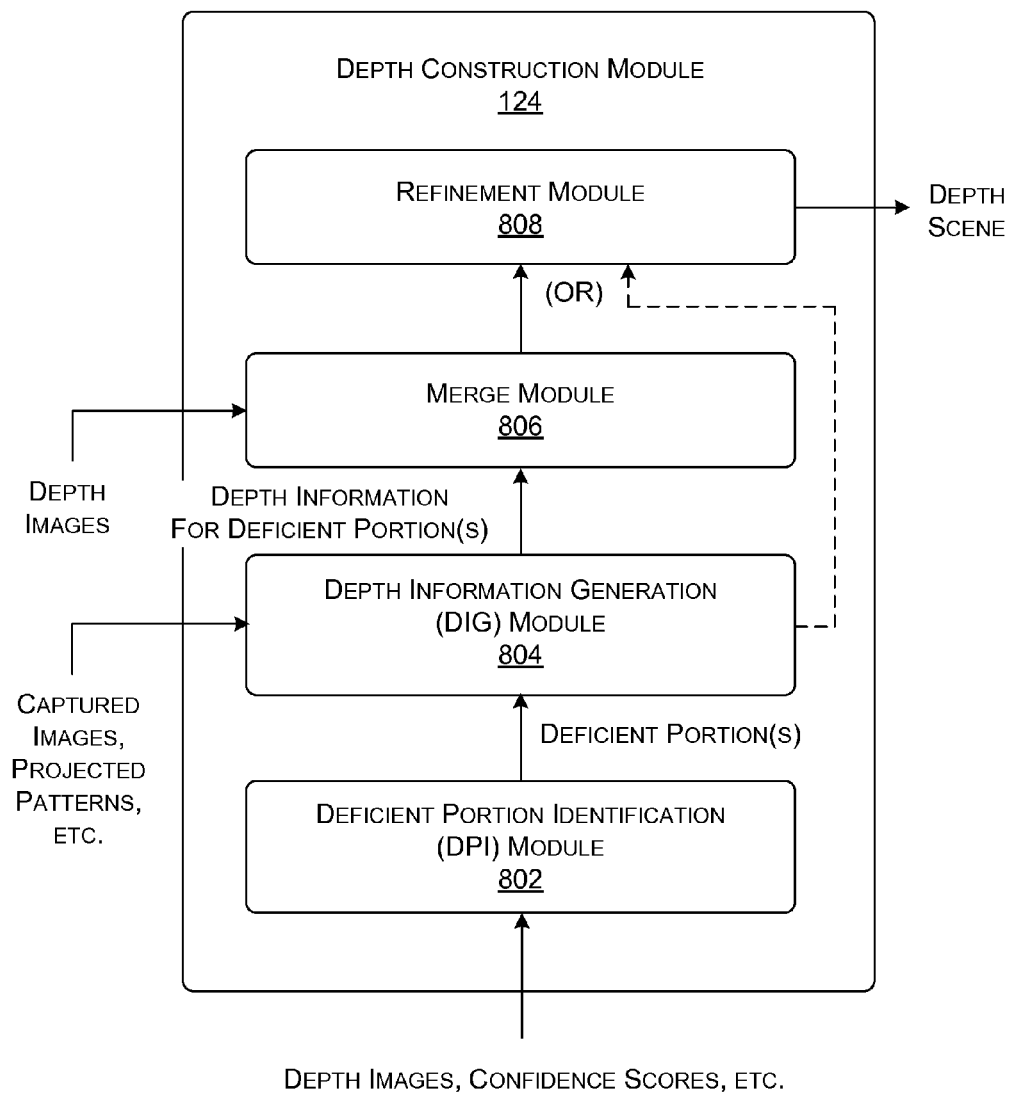
FIG. 8 shows one illustrative implementation of a depth construction module provided by the depth capture system of FIG. 1.

The depth construction module 124 constructs the depth scene based on information provided by the individual depth capture units. FIG. 8, to be described in turn below, provides illustrative details regarding the operation of the depth construction module 124. By way of overview, the depth construction module 124 can use a multi-view reconstruction technique that jointly takes into consideration the captured images produced by individual depth capture units. That is, whereas each depth capture unit generates a depth image based on its local analysis of a single captured image and a single projected pattern, the depth construction module 124, in a more global fashion, takes into account the output of plural depth capture units. As will be set forth in detail, this allows the depth construction module 124 to effectively address deficient portions in the depth images provided by the individual depth capture units.

In one mode of operation, the depth construction module 124 can receive depth images from the plural depth capture units (106, 108, . . . ). The depth construction module 124 can then identify deficient portions (e.g., "holes") in the depth images. The depth construction module 124 can then use any type of multi-view reconstruction technique to generate depth information for the deficient portions.

In a second mode of operation, the depth construction module 124 can use a multi-view reconstruction technique to process the entire scene represented by the captured images. As part thereof, this process implicitly takes into account deficient portions in the depth images, without having to expressly identify those deficient portions.

Figure 2:
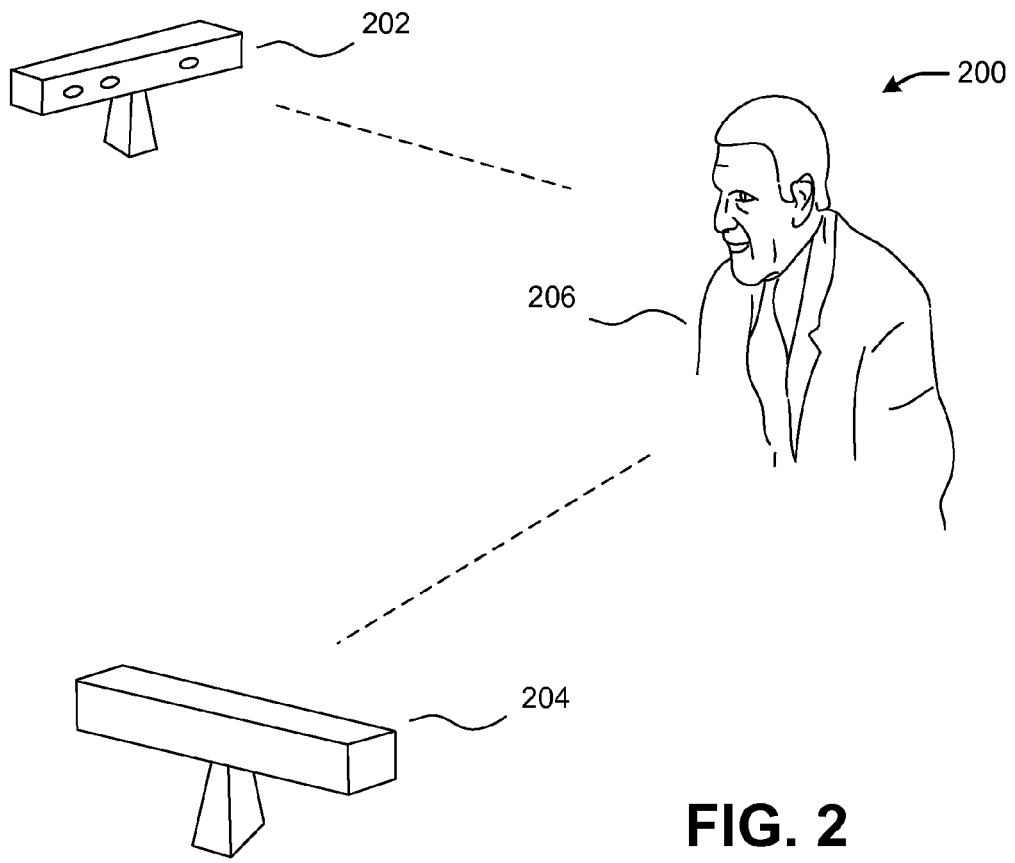
FIG. 2 shows an illustrative environment that includes two depth capture units which capture different portions of an object.

Advancing to FIG. 2, this figure shows an environment 200 in which the depth capture system 100 (of FIG. 1) can be applied. This environment 200 will serve as a running simplified example herein. The environment 200 includes two depth capture units, namely, a first depth capture unit 202 and a second depth capture unit 204. The two depth capture units (202, 204) project their respective patterns onto an object 206, here corresponding to a person. The first depth capture unit 202 then captures a representation of a first portion of the object 206 from a first angle, while the second depth capture unit 204 captures a representation of a second portion of the object 206 from a second angle. Together, the depth capture system 100 uses the depth images generated by these depth capture units (202, 204) to provide a more inclusive representation of the surface of the object 206. Namely, the first capture unit 202 can capture parts of the object 206 that cannot be seen by the second capture unit 204, and vice versa. Although the environment 200 only includes two depth capture units, it can include three or more depth capture units, and/or separate projectors and/or separate cameras.

Each depth capture unit may include, for instance, three apertures. A first aperture allows a projector to project an infrared-spectrum pattern onto the object 206. A second aperture allows a depth camera to receive a captured image of the object 206. An optional third aperture allows a video camera to capture a video image of the object 206.

Figure 3:
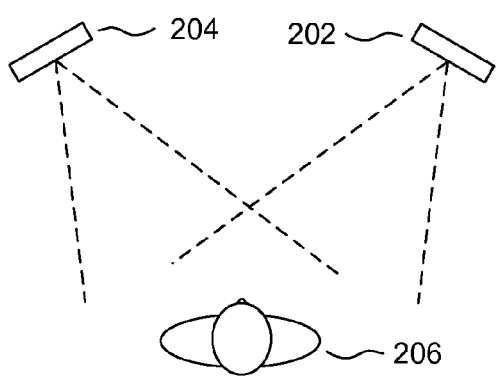
FIGS. 3 and 4 illustrate a manner in which the two depth capture units shown in FIG. 2 produce overlapping projected patterns.
Figure 4:
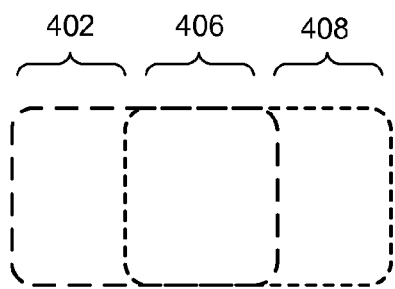

FIG. 3 shows a manner in which a first projected pattern, produced by the first depth capture unit 202, can overlap with a second projected pattern produced by the second depth capture unit 204. As a result, any particular part of the object 206 may be illuminated with: a) just the first projected pattern; b) just the second projected pattern; or c) an overlapping combination of the first projected pattern and the second projected pattern. And for this reason, any portion of the first captured image (captured by the first depth capture unit 202) may include any combination of the first projected pattern and the second projected pattern; likewise, any portion of the second captured image (captured by the second depth capture unit 204) may include any combination of the first projected pattern and the second projected pattern. For instance, FIG. 4 shows a representative portion of a captured image. It includes a part 402 that includes the first projected pattern, a part 404 that includes the second projected pattern, and a part 406 that includes a combination of the first projected pattern and the second projected pattern.

Figure 5:
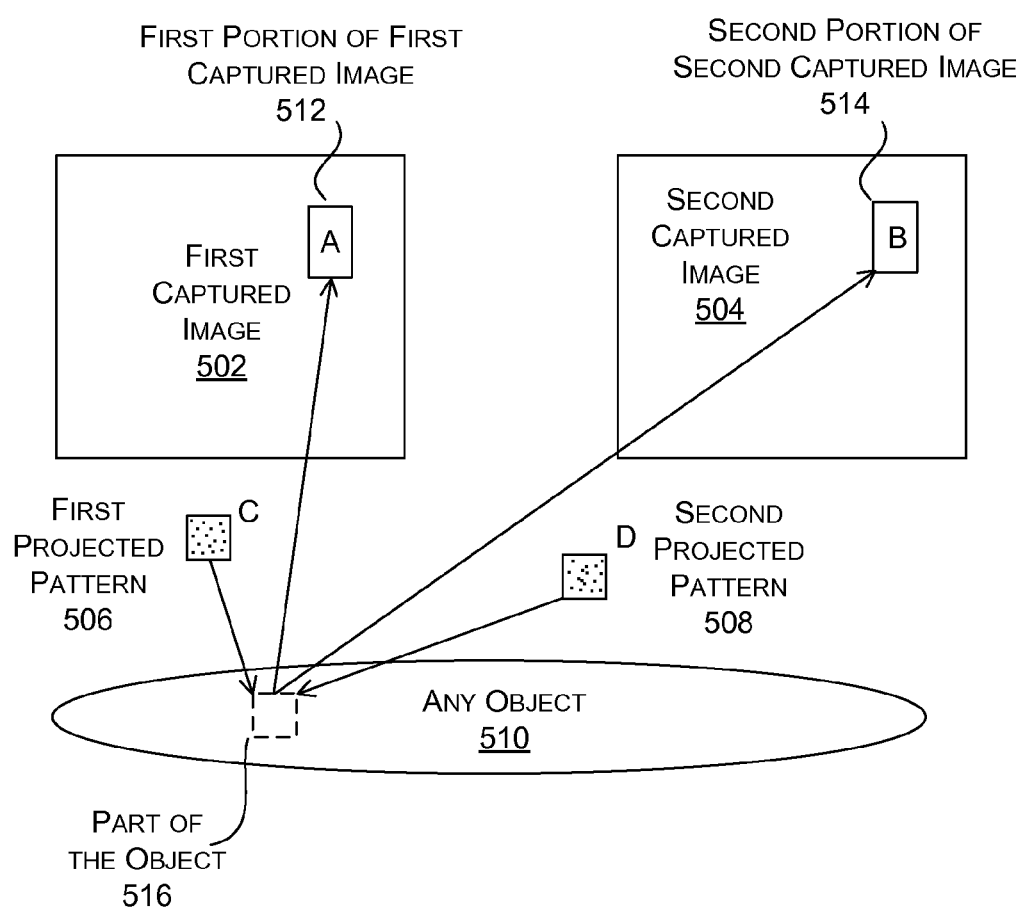
FIG. 5 graphically illustrates a constraint relationship that affects a first captured image and a second captured image produced by the two depth capture units of FIG. 2.

FIG. 5 shows illustrative relationships among a first captured image 502, a second captured image 504, a first projected pattern 506, and a second projected pattern 508. As will be described below, the depth construction module 124 can use these relationships as constraints which guide the reconstruction of the surface of an object 510.

Assume that a first portion (A) 512 of the first captured image 502 (captured by a first camera) and a second portion (B) 514 of the second captured image 504 (captured by a second camera) represent the same part 516 of the object 510, meaning that, in this particular example, the part 516 is visible to both the first camera and the second camera. As a first assertion, it can be concluded that the first portion 512 will match (or be similar to) the second portion 514. This is because both portions (512, 514) are "looking at" the same part 516 of the object 510.

Assume next that a first projector projects the first projected pattern (C) 506 onto the part 516, while a second projector projects the second projected pattern (D) 508 onto the same part 516. This means that the part 516 is illuminated by a combination of the first projected pattern 506 and the second projected pattern 508, i.e., C+D. As a second assertion, it can be concluded that the first portion (A) 512 will match (or be similar to) the combination of C+D (if, in fact, the part 516 is visible to the first camera), and, likewise, the second portion (B) 514 will match (or be similar to) the combination of C+D (if, in fact, the part 516 is visible to the second camera).

More formally stated, for the case of two depth capture units, the constraint relationship can be expressed as: (1) $\alpha I_{P1} + \beta I_{P2} = I_{C1}$ (if the part 516 is at least visible to the first camera and is at least captured by $I_{C1}$); (2) $\alpha I_{P1} + \beta I_{P2} = I_{C2}$ (if the part 516 is at least visible to the second camera is captured by at least $I_{C2}$); and (3) $I_{C1} = I_{C2}$ (if the part 516 is visible to both the first camera and the second camera and is captured by $I_{C1}$ and $I_{C2}$). This set of equations can be summarized by the constraint equation: $\alpha I_{P1} + \beta I_{P2} \propto \gamma I_{C1} \propto \delta I_{C2}$. In the particular example of FIG. 5, $I_{P1}$ and $I_{P2}$ correspond, respectively, to the first projected pattern 506 and the second projected pattern 508 which impinge the part 516. $I_{C1}$ and $I_{C2}$ correspond, respectively, to the first portion 512 and the second portion 514. The parameters $\alpha$ and $\beta$ indicate an extent to which, respectively, the first projected pattern 506 and the second projected pattern 508 impinge the part 516, e.g., where $0 \leq \alpha \leq 1$, and $0 \leq \beta \leq 1$. The parameters $\gamma$ and $\delta$ indicate an extent to which, respectively, the part 516 is visible to the first camera and the second camera for a particular portion under consideration, e.g., where $\gamma=0$ or 1, and $\delta=0$ or 1. Generally, a part 516 of the surface may not be visible to a camera because it lies outside the field of view of the camera and/or there is some occlusion which prevents the camera from seeing it, etc. This constraint relationship can be extended for the case of an arbitrary number n of projectors and an arbitrary number m of cameras as follows: $\alpha I_{P1} + \beta I_{P2} + \ldots \tau I_{Pn} \propto \gamma I_{C1} \propto \delta I_{C2} \propto \ldots \omega I_{Cm}$, where, in a first case, n=m, and, in a second case, n≠m.

Figure 6:
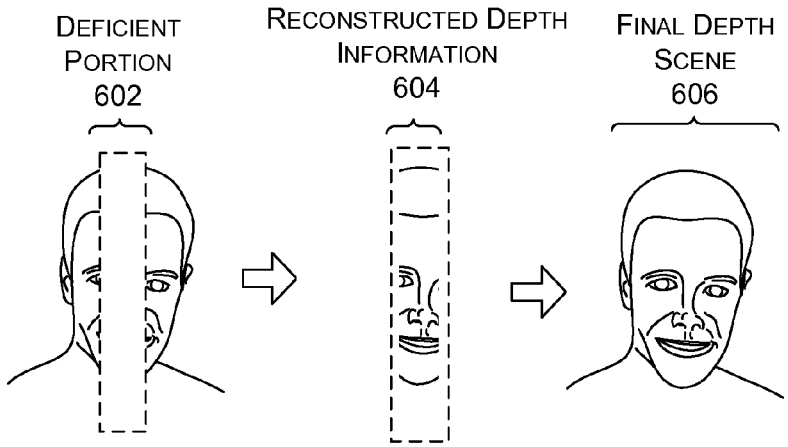
FIG. 6 illustrates a manner in which the depth capture system (of FIG. 1) can remedy a deficient portion produced by the two depth capture units in FIG. 2.

Advancing to FIG. 6, this figure shows an example of one manner in which the depth capture system 100 can remedy deficient portions in the depth images provided by the depth capture units. For example, assume that the middle of a person's face is illuminated with a combination of two projected patterns. As a result, each depth capturing unit may be unable to successfully interpret this region of the object. And as a result, each depth capture unit may produce a depth image having a deficient portion 602 for this region (as shown in the far left of FIG. 6).

In one mode of operation, the depth construction module 124 uses a multi-view reconstruction technique to selectively generate depth information 604 for the deficient portion 602 (as shown in the middle part of FIG. 6). The multi-view reconstruction technique can perform this task by jointly relying on the first captured image provided by the first depth capture unit and the second captured image provided by the second depth capture unit. Then, the depth construction module 124 can merge the depth information 604 with the original depth images to produce the final depth scene 606 (as shown in the far right part of FIG. 6).

FIG. 7 shows one implementation of a local processing module 702 that can be employed by any depth capture unit (e.g., corresponding to either the local processing module 114 or the local processing module 120 shown in FIG. 1). The local processing module 702 receives, as input, a captured image provided by a camera, together with a representation of the projected pattern which it projects onto the object. A correlation module 704 compares portions of the projected pattern with portions of the captured image to detect correspondences between these two images. A depth determination module 706 uses a triangulation technique to provide depth values for each detected correspondence between the projected pattern and the captured image. Taken together, these depth values constitute a depth image. The local processing module 702 can also optionally provide confidence scores which reflect the level of certainty associated with depth values in the depth image.

FIG. 8 shows one implementation of the depth construction module 124 of FIG. 1. The depth construction module 124 receives depth images from the individual depth capture units (e.g., 106, 108, . . . ). The depth construction module 124 can also receive other information from the depth capture units (106, 108, . . . ), such as the captured images provided by the cameras (112, 118, . . . ), the confidence scores generated by the local processing modules (114, 120, . . . ), and so on.

The depth construction module 124 can operate in at least two basic modes and can invoke different sets of modules for different modes. In a first mode, the depth construction module 124 identifies deficient portions in the depth images that it receives, and then "fills in" those portions. In a second mode, the depth construction module 124 processes the original captured images (rather than the depth images), without first expressly identifying the presence of deficient portions in the captured images.

First describing the operation of the first mode, a deficient portion identification (DPI) module 802 receives the original depth images and identifies deficient portions in the depth images. The DPI module 802 can determine the presence of a deficient portion in a depth image in different ways or combinations of ways. Accordingly to a first technique, a depth capture unit will omit meaningful distance values for those regions in which it is "confused," e.g., in response to the presence of overlapping projected patterns, occlusions, non-reflectors, and/or other anomalies. If so, the DPI module 802 can identify the presence of any such missing portion of a depth image as a deficient portion.

To facilitate the above operation, the DPI module 802 can include a driver which sets a threshold at which each depth capture unit discriminates between meaningful depth values and noise. This threshold can be tuned such that each depth capture unit will produce a "hole" for any part of the object that includes overlapping patterns.

In a second technique, the DPI module 802 can receive confidence scores from the depth capture units, where, as said, a confidence score for a depth value indicates a level of confidence associated with this depth value. The DPI module 802 can identify any depth values having confidence scores below a prescribed threshold as deficient portions of the depth image.

In a third technique, assume that the DPI module 802 is unable to retrieve confidence scores directly from the depth capture units (e.g., because of interface/port limitations or the like). If so, the DPI module 802 can receive the original captured images and projected patterns from the depth capture units. The DPI module 802 can then duplicate the operation of the correlation module 704 (shown in FIG. 7), that is, by independently generating confidence scores for the depth values in the depth images. The DIPI module 802 can then proceed as in the second technique, e.g., by identifying any depth values having confidence scores below a prescribed threshold as deficient portions of the depth image.

Still other techniques and combinations of techniques can be used to detect the presence of deficient portions in the depth images.

A depth information generation (DIG) module 804 next generates depth information for the deficient portions. It performs this technique by jointly processing at least the captured images provided by the cameras of the depth capture units using any type of multi-view reconstruction technique. In other words, each captured image provided by a camera constitutes a view. The multi-view reconstruction technique constructs depth information from these separate views.

The DIG module 804 can use any multi-view reconstruction technique to generate the depth information for the deficient portions. Representative multi-view reconstruction techniques include, but are not limited to: a plane sweeping technique (e.g., as described in Collins, Robert T., "A Space-Sweep Approach to True Multi-Image Matching," *Proceedings of the* 1996 *Conference on Computer Vision and Pattern Recognition,* 1996); a voxel coloring technique (e.g., as described in Seitz, et al., "Photorealistic Scene Reconstruction by Voxel Coloring," *Proceedings of the* 1997 *Conference on Computer Vision and Pattern Recognition,* 1997); a graph-cut technique (e.g., as described in Kolmogorov, et al., "Multi-camera Scene Reconstruction via Graph Cuts," *Proceedings of the* 7*th European Conference on Computer Vision-Part III,* 2002, pp. 82-96); a belief propagation technique (e.g., as described in Sun, et al., "Stereo Matching Using Belief Propagation," *IEEE Transactions on Pattern Analysis and Machine Intelligence,* Vol. 5, No. 7, July 2002, pp. 787-800), and so on.

In addition, or alternatively, the DIG module 804 can generate depth information using the novel plane sweeping technique that is described in Section B (below).

A merge module 806 receives the depth information that is generated by the DIG module 804 for the deficient portions. The merge module 806 integrates this depth information with the non-deficient parts of the original depth images provided by the depth capture units. This operation yields a depth scene that removes or at least reduces the presence of deficient portions attributed to overlapping projected patterns and other anomalies.

Finally, a refinement module 808 can perform further processing on the depth scene to improve its accuracy. For example, the DIG module 804 can use plane sweeping or some other multi-view reconstruction technique that is relatively quick and efficient to perform. The refinement module 808 can optionally supplement this processing by performing more accurate (but more processor-intensive and time-intensive) forms of multi-view reconstruction techniques, such as, but not limited to, the above-mentioned graph-cut technique or the belief propagation technique.

In a second mode of operation, the DIG module 804 can construct the entire depth scene based on the original captured images, effectively treating the captured input images as input views. As such, this mode of operation can forego the functions performed by the DPI module 802 and the merge module 806. For example, the DIG module 804 can apply the novel plane sweeping technique described below in section B. That new algorithm leverages the types of relationships described above with respect to FIG. 5.

B. Illustrative Processes

FIGS. 9-13 show procedures that describe the operation of the depth capture system 100 of FIG. 1 in flowchart form. Since the principles underlying the operation of the depth capture system 100 have already been described in Section A, some operations will be addressed in summary fashion in this section.

Figure 9:
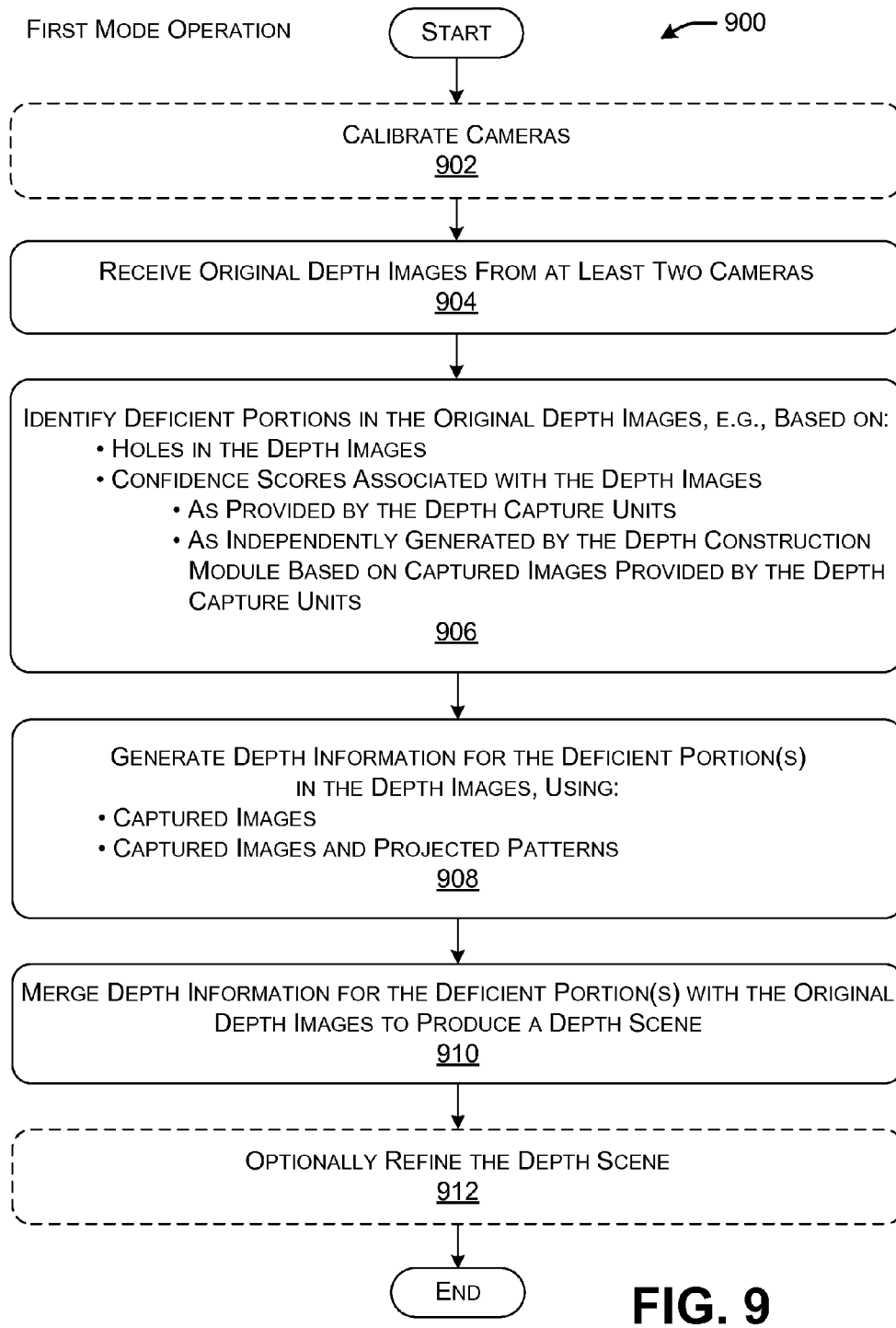
FIG. 9 shows a first manner of operation of the depth capture system of FIG. 1.

Starting with FIG. 9, this figure shows a procedure 900 which corresponds to a first mode of operation of the depth construction module 124. This procedure 900 parallels the description of FIG. 8 in Section A.

In block 902, the calibration module 122 calibrates the cameras employed by the depth capture units. The calibration module 122 can perform this task in different ways. According to a first technique, a user can place a three-dimensional reference object in the field of view of a camera. The reference object may have a pattern having known real-world positions. The camera captures an image of this reference object. The calibration module 122 then uses well known techniques to map the captured image to the real-world positions associated with the reference object. Note, for example, Faugeras, Olivier, *Three-Dimensional Computer Vision: A Geometric Viewpoint,* Cambridge, Mass., MIT Press, 1993. According to a second technique, a user can calibrate each camera by capturing a model plane that is moved to different respective positions in the field of view of the camera, e.g., using the technique described in Zhang, Zhengyou, "A Flexible New Technique for Camera Calibration," *IEEE Transactions on Pattern Analysis and Machine Intelligence*, Vol. 22, November 2000, pp. 1330-1334. Still other calibration techniques can be used.

In block 904, the depth construction module 124 receives depth images from at least two depth capture units (e.g., depth capture units 106, 108, . . . ).

In block 906, the depth construction module 124 identifies the presence of deficient portions in the depth images (if any). The depth construction module 124 can use any one or more the techniques described in Section A to perform this function.

In block 908, the depth construction module 124 uses a multi-view reconstruction technique to generate depth information for the deficient portions. The depth construction module 124 can use any approach to perform this function, such as the new plane sweeping technique to be described below.

In block 910, the depth construction module 124 merges the depth information generated in block 908 with the non-deficient parts of the depth images. This yields a depth scene that eliminates or reduces the presence of deficient portions attributed to overlapping projected patterns and other anomalies.

In block 912, the depth construction module 124 uses a multi-view reconstruction technique to refine the depth scene. For example, the depth construction module 124 can use the graph-cut technique and/or the belief propagation technique to perform this task.

As a closing remarking, the block 902 has a dashed-line border to indicate that calibration need not be performed for every execution of the procedure 900. Block 912 has a dashed-line border to indicate that it can be omitted.

Figure 10:
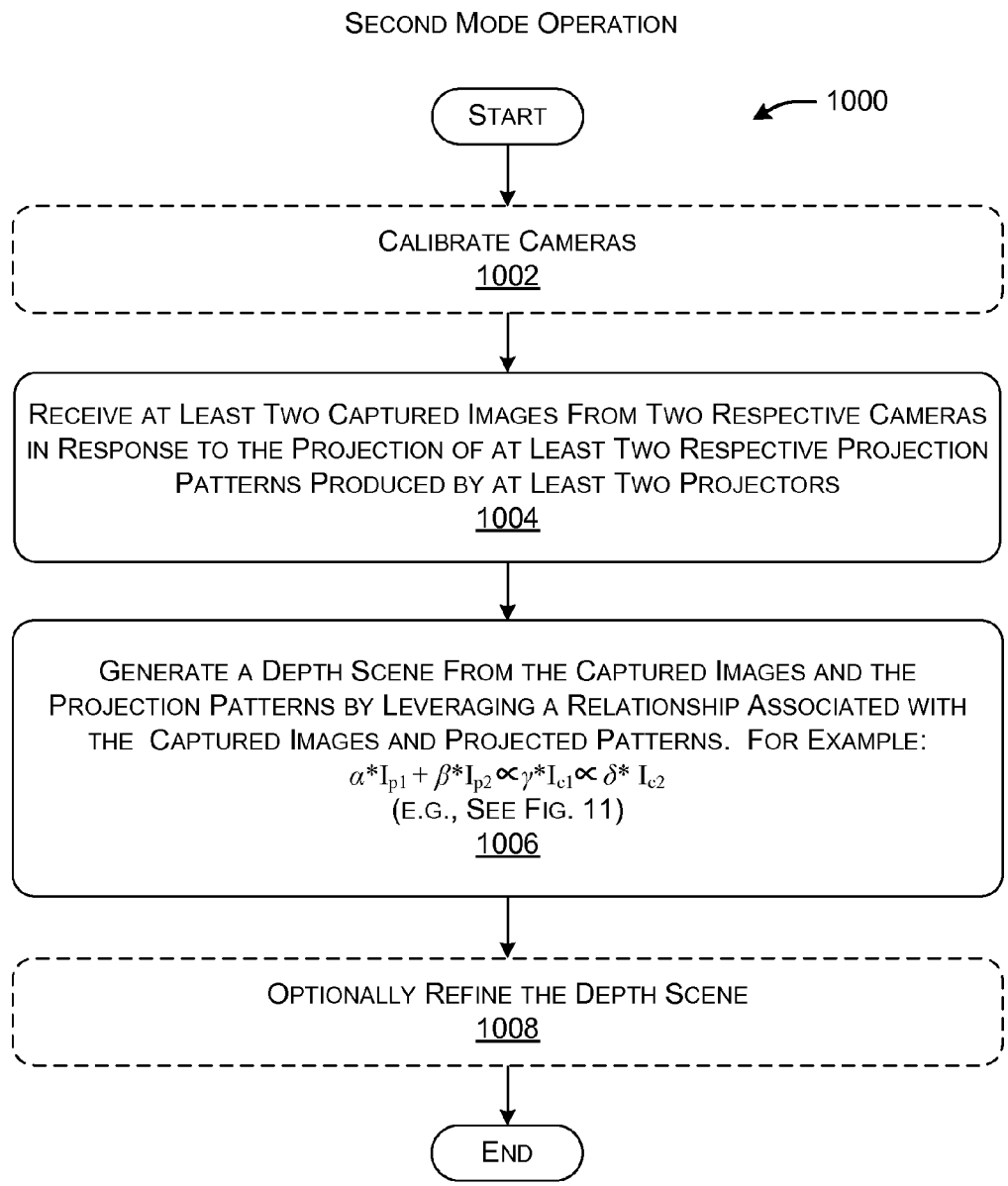
FIG. 10 shows a second manner of operation of the depth capture system of FIG. 1, which can be used in conjunction with the procedure of FIG. 9, or as a separate stand-alone procedure.

Advancing to FIG. 10, this figure describes a novel procedure 1000 that can be used to perform the multi-view reconstruction for the deficient portions in block 908 of FIG. 9. Alternatively, the procedure 1000 of FIG. 10 can be used to generate a depth scene from the original captured images without first expressly identifying the presence of deficient portions. FIG. 10 will be explained below in the context of this latter second mode of processing.

In block 1002, the calibration module 122 calibrates the cameras of the depth capture units. This operation can be performed in the same manner described above for block 902 of FIG. 9.

In block 1004, the depth construction module 124 receives at least two captured images from two respective cameras of two respective depth capture units, and/or from separate cameras. For example, the first captured image is produced by a first depth capture unit in response to the projection of a first projected pattern onto an object. Similarly, the second captured image is produced by a second depth capture unit in response to the projection of a second projected pattern onto the object.

Figure 11:
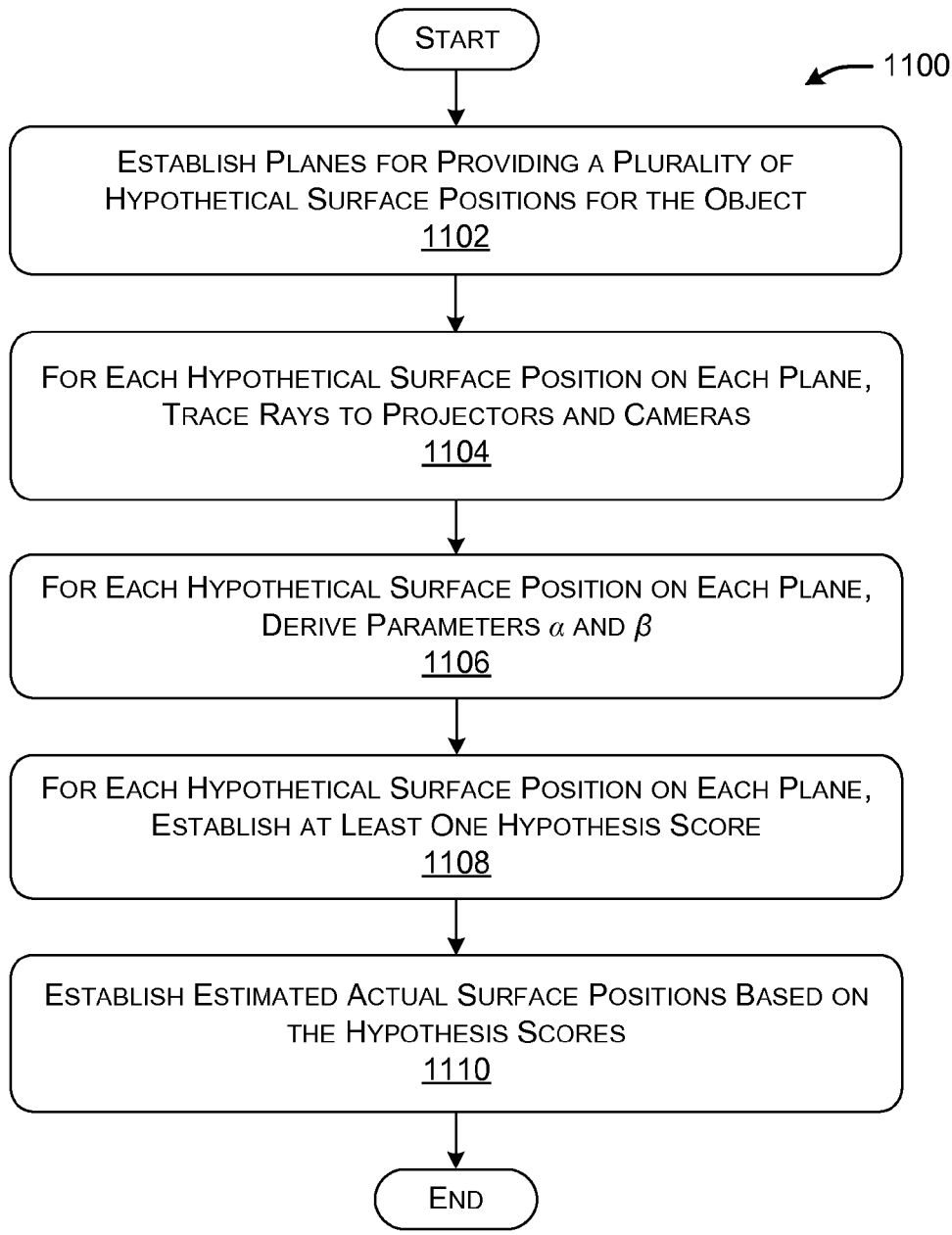
FIG. 11 shows a plane sweeping technique that can be used to implement aspects of the procedure of FIG. 10.

In block 1006, the depth construction module 124 uses a multi-view depth reconstruction technique to generate a depth scene. This multi-view technique leverages the above-described relationships among the various captured images and various projected patterns. In a sense, the multi-view technique considers the projected patterns as tantamount to additional views captured by cameras, although, in actuality, the patterns represent a priori information which merely drives the operation of the projectors. The depth construction module 124 can leverage these relationships to efficiently estimate the actual surface of the object. FIG. 11 will provide additional information regarding one implementation of block 1006.

In block 1008, the depth construction module 124 can optionally perform refinement of the depth scene provided in block 1006, e.g., using the graph-cut technique, the belief propagation technique, and so on.

FIG. 11 describes a procedure 1100 for constructing depth information using a new plane sweeping technique. As said, the procedure 1100 can be used to construct the depth information for the deficient portions in the first mode, or to construct the entire depth scene in the second mode. The procedure 1100 will be described below in the second latter-mode context. Further, the procedure 1100 will be described in conjunction with the illustrative examples shown in FIGS. 12 and 13.

Figure 12:
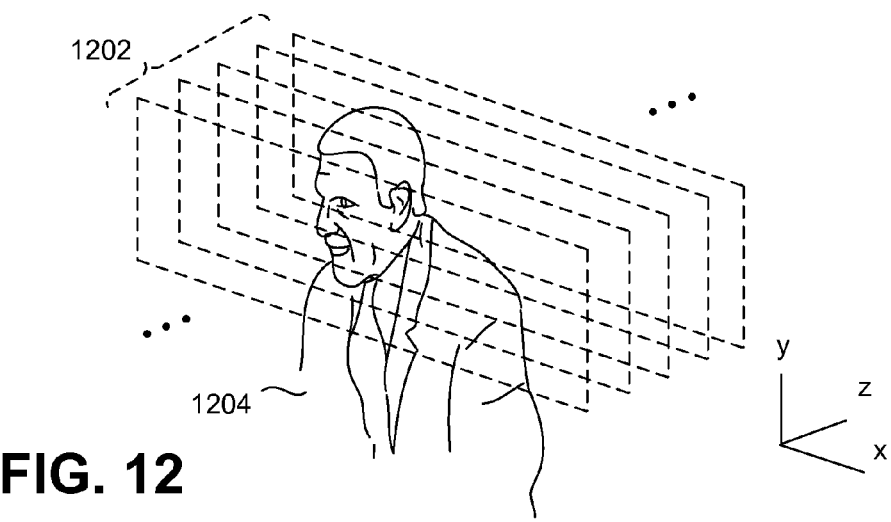
FIGS. 12 and 13 provide examples which complement the description of the plane sweeping technique of FIG. 11.
Figure 13:
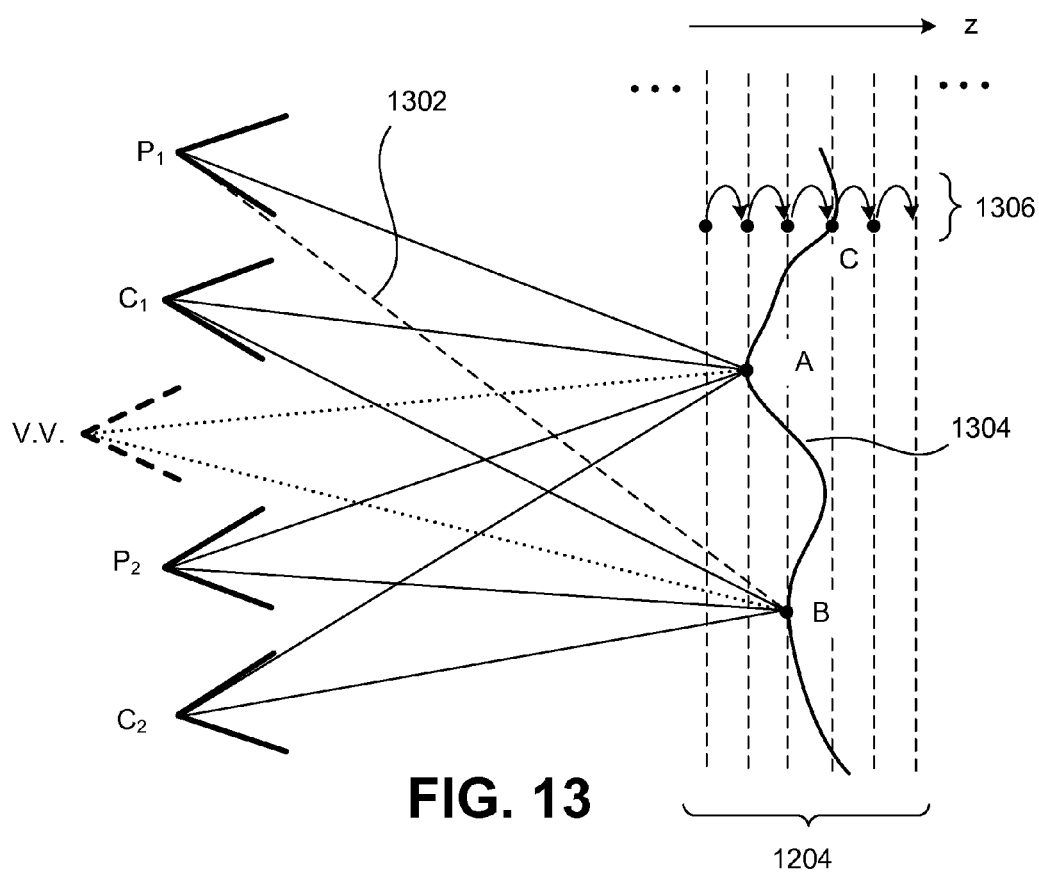

In block 1102, the depth construction module 124 establishes parallel planes 1202 across a representation of the object 1204 (as shown in FIG. 12). The depth construction module 124 establishes these planes with relation to a virtual viewpoint (V.V.) (as shown in FIG. 13). The virtual viewpoint corresponds to a vantage point from which the depth scene is to be constructed. Each plane (associated with a z value along a z axis) defines a plurality of (x, y) hypothetical surface positions. By way of overview, the depth construction module 124 performs the procedure 1100 to investigate the tenability of these hypothetical surface positions, eventually identifying the subset of positions which likely correspond to actual surface positions of the object 1204.

In block 1104, the depth construction module 124 projects rays, for each hypothetical surface position, back to each of the cameras and projectors. FIG. 13 illustrates this operation with respect to two hypothetical surface positions, A and B. For each position, the depth construction module 124 projects a line from the position to projectors $P_1$ and $P_2$, and to cameras $C_1$ and $C_2$. If there are more than two depth capture units, the depth construction module 124 will generate additional rays. In effect, the traced rays associate each hypothetical surface position with a particular portion ($I_{C_1}$) of the first captured image (provided by $C_1$), a particular portion ($I_{C_2}$) of the second captured image (provided by $C_2$), a particular portion ($I_{P_1}$) of the first projected pattern (provided by $P_1$), and a particular portion ($I_{P_2}$) of the second projected pattern (provided by $P_2$). In an alternative manner of interpretation, the operation of block 1104 can be viewed as projecting the first and second captured images and the first and second projected patterns onto the various planes 1202.

In block 1106, the depth construction module 124 generates the parameters α and β for each hypothetical surface position. As described in Section A, the parameters α and β describe whether the first and second projected patterns, respectively, impinge a particular part of the object. In the context of FIG. 11, the parameters α and β control whether the first and second projected patterns, respectively, can contribute to a particular hypothetical surface point under consideration. For example, for the hypothetical surface position A, both projectors P1 and P2 project patterns which are capable of impinging the position A. In contrast, for the hypothetical surface position B, the projector P2 can project its pattern on position B, but the projector P1 cannot "see" position B (as represented by the dashed line 1302).

Different techniques can be used to derive the α and β parameters for each hypothetical surface position. In one technique, a least squares technique can be used to calculate α and β for different respective hypotheses, e.g., by minimizing: (1) $|\alpha I_{P_1}+\beta I_{P_2}-I_{C_1}|^2+|\alpha I_{P_1}+\beta I_{P_2}-I_{C_2}|^2+|I_{C_1}-I_{C_2}|^2$ (for $\gamma=\delta=1$); (2) $|\alpha I_{P1}+\beta I_{P2}-I_{C1}|^2$ (for $\gamma=1$ and $\delta=0$); and (3) $|\alpha I_{P1}+\beta I_{P2}-I_{C2}|^2$ (for $\gamma=0$ and $\delta=1$). The hypothesis $\gamma=\delta=0$ is not considered. The terms $I_{P1}$ and $I_{P2}$ refer to patches associated with the first and second projected patterns, and $I_{C1}$ and $I_{C2}$ refer to patches associated with the first and second captured images.

In block 1108, the depth construction module 124 establishes at least one hypothesis score for each hypothetical surface position. For example, the depth construction module 124 can generate at least one hypothesis score which represents the likelihood that the hypothetical surface position satisfies the constraint relationship described above, namely, $\alpha I_{P1}+\beta I_{P2} \propto \gamma I_{C1} \propto \delta I_{C2}$, where the values $\alpha$ and $\beta$ are selected in the manner described above for each respective hypothesis under consideration. In this process, for example, the depth construction module 124 investigates the possibility that $\gamma$ equals zero or one, and $\delta$ equals zero or one. As said, the hypothesis $\gamma=\delta=0$ is not considered.

An incorrect hypothetical surface position will have a low hypothesis score for a particular hypothesis under consideration when it fails to satisfy the above constraint relationship. For instance, assume that a hypothesis is being tested that asserts that a hypothetical surface position is visible to both cameras and is represented by $I_{C1}$ and $I_{C2}$. However, if, in fact, the identified portion ($I_{C1}$) in the first captured image does not equal the identified portion ($I_{C2}$) in the second captured image, then this hypothesis is unlikely. These identified portions are instead associated with some other actual surface position(s).

In an alternative implementation, the depth construction module 124 can use a simplified constraint equation, namely, $I_{C1}=I_{C2}$ (for the hypothesis $\gamma=\delta=1$). In other words, this modified constraint relationship only demands that portions of the captured images that correspond to the same actual surface position will be equal (or similar) to each other. This modified constraint relationship allows the depth construction module 124 to omit the processing performed in block 1106, and thus is more efficient, but potentially less accurate.

In block 1110, the depth construction module 124 evaluates the hypothesis scores provided in block 1108 to estimate the actual surface of the object 1204. For example, in FIG. 13, assume that the line 1304 represents the actual surface of the object 1204. To determine the actual depth of this surface along a particular (x, y) value, the depth construction module 124 can perform successive analysis along an investigative path 1306. Namely, the depth construction module 124 can successively examine the hypothesis scores for different values of z along this investigation path 1306, selecting the highest hypothesis score. That highest score corresponds to the actual surface position (C).

C. Representative Processing Functionality

FIG. 14 sets forth illustrative electrical computing functionality 1400 that can be used to implement any aspect of the functions described above. For example, the computing functionality 1400 can be used to implement any aspect of any individual depth capture unit. Alternatively, or in addition, the computing functionality 1400 can be used to implement any aspect of the main processing module 104. In one case, the computing functionality 1400 may correspond to any type of computing device that includes one or more processing devices. The computing device can implement any part of its operations in hardware, software, firmware, or any combination thereof. In all cases, the computing functionality 1400 represents one or more physical and tangible processing mechanisms.

The computing functionality 1400 can include volatile and non-volatile memory, such as RAM 1402 and ROM 1404, as well as one or more processing devices 1406 (e.g., one or more CPUs, and/or one or more GPUs, etc.). The computing functionality 1400 also optionally includes various media devices 1408, such as a hard disk module, an optical disk module, and so forth. The computing functionality 1400 can perform various operations identified above when the processing device(s) 1406 executes instructions that are maintained by memory (e.g., RAM 1402, ROM 1404, or elsewhere).

More generally, instructions and other information can be stored on any computer readable medium 1410, including, but not limited to, static memory storage devices, magnetic storage devices, optical storage devices, and so on. The term computer readable medium also encompasses plural storage devices. In all cases, the computer readable medium 1410 represents some form of physical and tangible storage entity.

The computing functionality 1400 also includes an input/output module 1412 for receiving various inputs (via input modules 1414), and for providing various outputs (via output modules). One particular output mechanism may include a presentation module 1416 and an associated graphical user interface (GUI) 1418. The computing functionality 1400 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), etc., or any combination thereof. The communication conduit(s) 1422 can include any combination of hardwired links, wireless links, routers, gateway functionality, name servers, etc., governed by any protocol or combination of protocols.

In closing, the description may have described various concepts in the context of illustrative challenges or problems. This manner of explication does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage device for storing computer readable instructions, the computer readable instructions providing a depth construction module executed by one or more processing devices, the computer readable instructions performing a method comprising:
   receiving at least a first depth image from a first depth capture unit and a second depth image from a second depth capture unit,
   the first depth image and the second depth image being generated, respectively, by the first depth capture unit and the second depth capture unit, in response to:
      projecting, using a first projector, a first projected pattern onto an object;
      projecting, using a second projector, a second projected pattern onto the object;
      capturing, using a first camera, a first captured image of the object;

capturing, using a second camera, a second captured image of the object;

providing the first depth image based on the first projected pattern and the first captured image; and providing the second depth image based on the second projected pattern and the second captured image;

identifying at least one deficient portion in at least one of the first depth image and the second depth image;

generating depth information for said at least one deficient portion using a multi-view reconstruction technique, the multi-view reconstruction technique including establishing a plurality of planes that provide a plurality of hypothetical surface positions for the object and for each hypothetical surface position on each plane, deriving parameters which indicate an extent to which respective projected patterns impinge the hypothetical surface position; and merging the depth information for said at least one deficient portion with at least the first depth image and the second depth image to produce a depth scene that provides a depth map of the object based on said parameters.

2. The storage device of claim 1, wherein said at least one deficient portion is from a part of the object on which at least the first projected pattern overlaps the second projected pattern.

3. The storage device of claim 1, wherein said at least one deficient portion corresponds to an omission of at least one depth value in at least one of the first depth image and the second depth image.

4. The storage device of claim 1, wherein the method further comprises:

receiving first confidence scores from the first depth capture unit associated with depths in the first depth image; and receiving second confidence scores from the second depth capture unit associated with depths in the second depth image, wherein said at least one deficient portion is assessed based the first confidence scores and the second confidence scores.

5. The storage device of claim 4, wherein the first confidence scores comprise cross-correlation scores produced by matching the first captured image with the first projected pattern, and the second confidence scores comprise cross-correlation scores produced by matching the second captured image with the second projected pattern.

6. The storage device of claim 1, wherein the method further comprises:

receiving the first captured image from the first depth capture unit and the second captured image from the second depth capture unit;

generating first confidence scores by matching the first captured image with the first projected pattern;

generating second confidence scores by matching the second captured image with the second projected pattern, and wherein said at least one deficient portion is assessed based on the first confidence scores and the second confidence scores.

7. The storage device of claim 1, wherein the multi-view reconstruction technique jointly takes into consideration plural captured images provided by plural depth capture units.

8. The storage device of claim 1, wherein the multi-view reconstruction technique comprises a plane sweeping technique.

9. The storage device of claim 1, wherein said generating of the depth information for said at least one deficient portion leverages a constraint relationship that affects at least the first captured image and the second captured image.

10. The storage device of claim 9, wherein the constraint relationship includes:

a first assertion that a first portion of the first captured image will match a second portion of the second captured image when the first portion and the second portion represent a same part of the object; and a second assertion that each of the first portion and the second portion will match an aggregation of projected patterns which impinges the part of the object.

11. A device comprising:

a processor; and executable instructions operable by the processor, the executable instructions comprising a method for depth reconstruction, the method comprising:

receiving at least a first depth image from a first depth capture unit and a second depth image from a second depth capture unit, the first depth image and the second depth image being generated, respectively, by the first depth capture unit and the second depth capture unit, in response to:

projecting, using a first projector, a first projected pattern onto an object;

projecting, using a second projector, a second projected pattern onto the object;

capturing, using a first camera, a first captured image of the object;

capturing, using a second camera, a second captured image of the object;

providing the first depth image based on the first projected pattern and the first captured image; and providing the second depth image based on the second projected pattern and the second captured image;

identifying at least one deficient portion in at least one of the first depth image and the second depth image;

generating depth information for the at least one deficient portion using a multi-view reconstruction technique, the multi-view reconstruction technique including establishing a plurality of planes that provide a plurality of hypothetical surface positions for the object and for each hypothetical surface position on each plane, deriving parameters which indicate an extent to which respective projected patterns impinge the hypothetical surface position; and merging the depth information for the at least one deficient portion with at least the first depth image and the second depth image to produce a depth scene that provides a depth map of the object based on said parameters.

12. The device of claim 11, wherein the method further comprises:

receiving first confidence scores from the first depth capture unit associated with depths in the first depth image; and receiving second confidence scores from the second depth capture unit associated with depths in the second depth image, wherein the at least one deficient portion is assessed based the first confidence scores and the second confidence scores.

13. The device of claim 12, wherein the first confidence scores comprise cross-correlation scores produced by matching the first captured image with the first projected pattern, and the second confidence scores comprise cross-correlation scores produced by matching the second captured image with the second projected pattern.

14. The device of claim 11, wherein the method further comprises:
receiving the first captured image from the first depth capture unit and the second captured image from the second depth capture unit;
generating first confidence scores by matching the first captured image with the first projected pattern; and
generating second confidence scores by matching the second captured image with the second projected pattern, wherein the at least one deficient portion is assessed based on the first confidence scores and the second confidence scores.

15. The device of claim 11, wherein the multi-view reconstruction technique jointly takes into consideration plural captured images provided by plural depth capture units.

16. The device of claim 11, wherein the multi-view reconstruction technique comprises a plane sweeping technique.

17. The device of claim 11, wherein the generating of the depth information for the at least one deficient portion leverages a constraint relationship that affects at least the first captured image and the second captured image.

18. The device of claim 17, wherein the constraint relationship includes:
a first assertion that a first portion of the first captured image will match a second portion of the second captured image when the first portion and the second portion represent a same part of the object; and
a second assertion that each of the first portion and the second portion will match an aggregation of projected patterns which impinges the part of the object.

19. An apparatus comprising:
a memory storing processor-executable instructions; and
a processor operatively coupled to the memory, wherein upon execution of the processor-executable instructions, the processor to perform a method comprising:
receiving at least a first depth image from a first depth capture unit and a second depth image from a second depth capture unit, the first depth image and the second depth image being generated, respectively, by the first depth capture unit and the second depth capture unit, in response to:
projecting, using a first projector, a first projected pattern onto an object;
projecting, using a second projector, a second projected pattern onto the object;
capturing, using a first camera, a first captured image of the object;
capturing, using a second camera, a second captured image of the object;
providing the first depth image based on the first projected pattern and the first captured image; and
providing the second depth image based on the second projected pattern and the second captured image;
identifying at least one deficient portion in at least one of the first depth image and the second depth image;
generating depth information for the at least one deficient portion using a multi-view reconstruction technique, the multi-view reconstruction technique including establishing a plurality of planes that provide a plurality of hypothetical surface positions for the object and for each hypothetical surface position on each plane, deriving parameters which indicate an extent to which respective projected patterns impinge the hypothetical surface position; and
merging the depth information for the at least one deficient portion with at least the first depth image and the second depth image to produce a depth scene that provides a depth map of the object based on said parameters.

20. The apparatus of claim 19, wherein the method further comprises:
receiving first confidence scores from the first depth capture unit associated with depths in the first depth image; and
receiving second confidence scores from the second depth capture unit associated with depths in the second depth image, wherein the at least one deficient portion is assessed based the first confidence scores and the second confidence scores.

* * * * *